United States Patent [19]

Hicks

[11] Patent Number: 4,972,665

[45] Date of Patent: Nov. 27, 1990

[54] MATERIAL EJECTING PADDLE

[76] Inventor: Donald D. Hicks, P.O. Box 321, Geraldine, Mont. 59446

[21] Appl. No.: 377,434

[22] Filed: Jul. 7, 1989

[51] Int. Cl.$^5$ .............................................. A01D 34/00
[52] U.S. Cl. ................................ 56/14.5; 56/DIG. 5; 198/518; 198/723
[58] Field of Search ...................... 56/14.4, 14.9, 14.6, 56/DIG. 5; 198/513, 518, 722, 723

[56] References Cited

U.S. PATENT DOCUMENTS

| | | | |
|---|---|---|---|
| 469,551 | 2/1892 | Donahoo | 198/518 X |
| 2,644,292 | 7/1953 | Oberholtz et al. | 56/14.5 X |
| 2,685,910 | 8/1954 | Frederick | 198/722 X |
| 2,851,144 | 9/1958 | Carroll | 195/518 |
| 2,934,881 | 5/1960 | Noble | 198/513 X |
| 3,043,030 | 7/1962 | Wisbey | 198/518 X |
| 4,261,475 | 4/1981 | van Maanen | 198/722 X |

Primary Examiner—George A. Suchfield
Attorney, Agent, or Firm—William D. West

[57] ABSTRACT

Removable paddles are disclosed for use on a grain auger to assist material flow when changing direction of flow from parallel to the auger's longitudinal axis to a flow path at right angles to the longitudinal axis of the auger. The device provides a mounting attachment at the base of the paddle unit using bolts through the auger tubing. The base of the paddle unit extends nearly perpendicular to the paddle-shaped member oriented lengthwise with the auger's longitudinal axis. Auger rotation thereby positively ejects transported material on contact with each revolution of the auger. Each paddle exhibits an "L" shaped cross section and the area, shape and angular orientation of the paddle blade is determined by the material requirements upon the auger tubing. Methods of paddle unit manufacture are also disclosed.

4 Claims, 2 Drawing Sheets

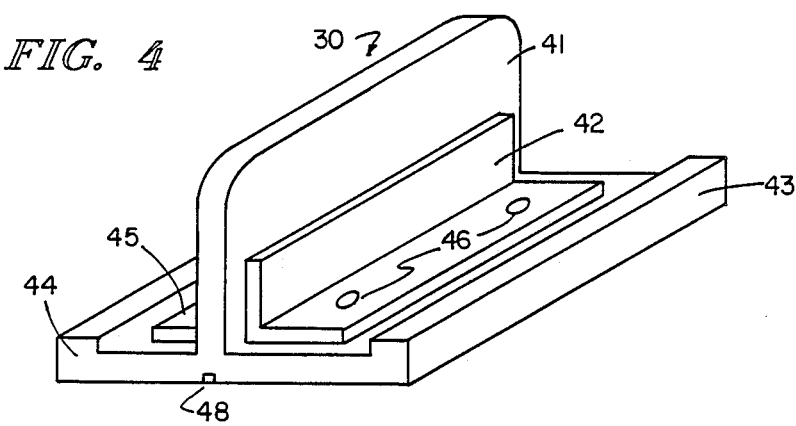
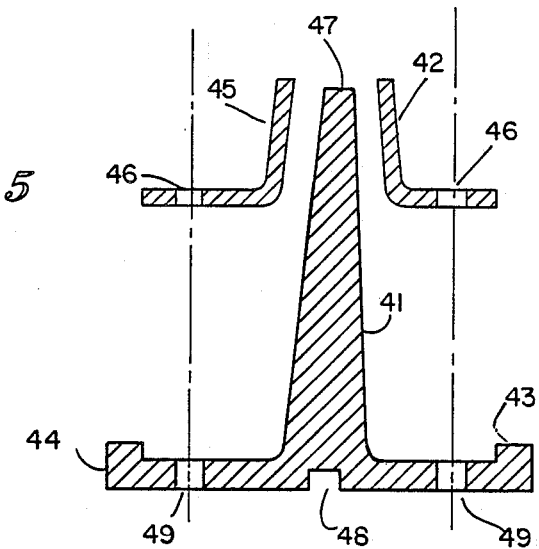
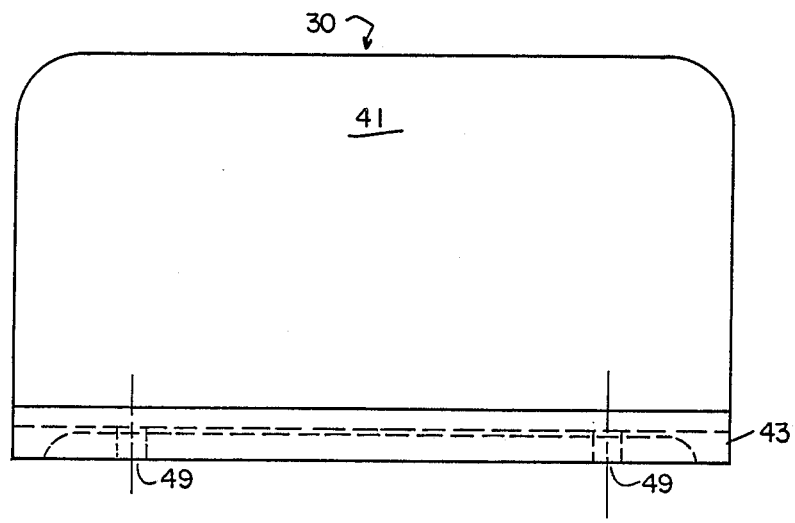

MATERIAL EJECTING PADDLE

BACKGROUND OF THE INVENTION

1. Field of the invention

This invention relates generally to a grain auger paddle and specifically to a flexible paddle having a base for mounting the paddle to an auger tubing in a variety of positions.

2. Discussion of the Technical Problems

Augers have become widely used in the transport of materials, primarily because of their ease of maintenance and initial low cost. They provide a highly reliable way to move materials in a direction parallel with their length, but are not efficient in discharging transported materials at right angles to the auger length (longitudinal axis).

When used in combine or crop gathering situations the accepted means of unloading an auger has generally become a system of retractable fingers at the point of desired ejection. This system of retractable fingers presents too little area striking the incoming material to change its direction of flow and retracts too soon, leaving a dead spot beneath and behind the center of the auger. This exceedingly inefficient performance in some cases has resulted in damaged crop materials, causing even greater difficulty in their transport. The cumulative effect of all this is a bunching of crop material in the auger center as it does not eject with positive action on each auger revolution, hindering the efficiency of auger transport of material to the congested central discharge area, finally resulting in the forced discharge of material in accumulated bunches into the machine instead of flowing in an even steady movement as it is gathered.

To properly perform, an auger must have a reliable mechanism for ejecting transported materials at the desired point of discharge with each revolution of the auger. This means of ejection must be moveable to feet the requirement of variable placement for varying conditions or for adding on to existing equipment. In the instant invention these conditions are met by a paddle-shaped extension from a base which is mountable by bolts through the auger tubing. When changing conditions require different placement, the device is unbolted and repositioned to meet the current needs This is an important requirement on a combine auger as the flighting length is often increased to move material farther toward the auger center under sparse conditions or decreased to accomplish unloading farther from the center under heavy crop conditions. The area presented by the striking faces of the paddles is also an important consideration When too great a striking area is presented to the incoming material, the material tends to spin with the rotation of the auger rather than to unload In the instant invention, striking area is adjusted by adding or removing paddle units For most, but not all, conditions, two paddle units are used.

The paddle face is oriented slightly rearward on its top edge from the base with its length parallel to the length of the auger when mounted and presents a flat striking face to the incoming material with each revolution of the auger, positively ejecting transported material at right angles to its initial direction of flow at the point of impact. The existing retractable auger fingers are left in place as they no longer tend to flail the material when it is being efficiently moved by the paddles.

The rearward angling of the paddle face from perpendicular tends to more efficiently unload the paddle after contact with the incoming material, decreasing any tendency to spin the material around the auger tubing. Paddle corners are also rounded to minimize any obstructing influence caused by the paddles to incoming material. For most applications the paddles are positioned at 180 degrees rotation past the flighting ends and inward toward the auger center from the flighting ends. This allows the transported material to enter far enough to be spread evenly across the width of the threshing apparatus when the paddle unloads the auger on each revolution.

The paddles lend themselves to various means of construction, all of which are sufficient as long as they present the proper area, configuration, durability, flexibility and base means which is moveable. Under extremely harsh conditions a solid steel base with a threaded back-up plate beneath the inner side of the auger tubing is used. Upon this base is attached a replaceable paddle bat. For less demanding situations a molded one pieced paddle and base is adequate and more economical to manufacture, giving greater economy to the user. The molded unit has several unique features. Having no back-up plate beneath the auger tubing, it requires only bolts, washers and nuts for mounting upon the auger tubing. It incorporates a strip of metal or material of similar durability the width of the unit on each side of the paddle member to tighten the nuts down upon and hold the flexible base in place more securely. The flexible base member has a molded rib on each edge which is raised to fit against the bracing strip to prevent the base from being pulled beneath the strip by the impacts of normal operation. To provide additional bracing where necessary under more severe conditions, the bracing strips are widened and angled to extend part way up to the paddle member of the unit on each side. This removes excess stress from the paddle-base juncture and will be furnished as conditions require. The molded unit possesses the additional feature of configuring to different sized auger tubing and is mountable with either face forward.

Generally, paddles will extend to the height of the auger flighting and are limited in surface area, because too great a striking area will cause the transported material to spin with the rotation of the auger tubing. Striking area is controlled by the number of units mounted.

The instant invention is directed to all of these needs as well as to others as explained in the following summary.

SUMMARY OF THE INVENTION

A primary object of this invention is to furnish a means of unloading transported material from an auger in a positive fashion with each revolution of the auger.

Another object of this invention is to unload the material transported by an auger in an even controlled flow at right angles to the length of the auger.

A further object of this invention is to provide a device to change the point of materials discharged by moving the point of attachment to the apparatus.

A still further object of this invention is to control the striking area of the paddle members by adding or removing units.

An additional object of the invention is to present as little as possible obstruction to incoming materials from the auger flighting to the central discharge area and to furnish as clean discharge of material as can be achieved.

Yet another object of the invention is to provide different workable constructions of the device to satisfy all conditions encountered, from a steel base with back-up plate and replaceable paddle to a single molded paddle and base unit with reinforced mounting strips for greater economy in less demanding conditions.

BRIEF DESCRIPTION OF THE DRAWINGS

The advantages of this invention will become apparent upon consideration of the following detailed disclosure of the invention, especially when taken in conjunction with the accompanying drawings, wherein:

FIG. 4 is a perspective view of a second embodiment of one of the material ejecting paddles with the associated mounting stiffeners.

FIG. 5 is an end cut away view of the paddle depicted in FIG. 4.

FIG. 6 is a side elevational view of a molded one-piece paddle in accordance with the present invention.

DESCRIPTION OF THE PREFERRED EMBODIMENT

Figure 1:
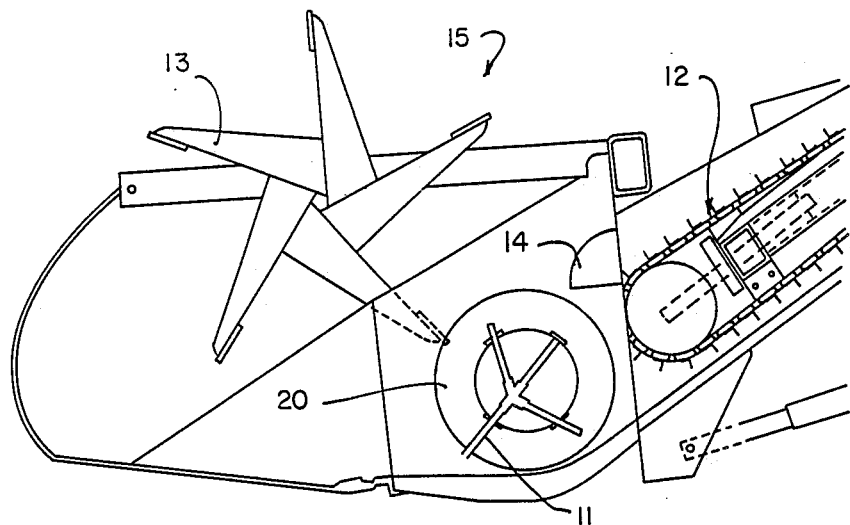
FIG. 1 is an end view of a prior art auger housing showing the retracting fingers used in a grain combine in accordance with the present invention.

With reference to FIG. 1, it can be seen that the retracting fingers 11 used in the prior art are attached to the platform auger 20 and eject the grain from along the auger 20 to the feeder conveyer 12 thus changing the movement of the material from parallel to the longitudinal axis of the auger 20 to a path at right angles to the longitudinal axis of the auger 20. As previously discussed, the prior art retracting fingers do not provide a positive ejection of the material and often damage the grain being ejected.

Figure 2:
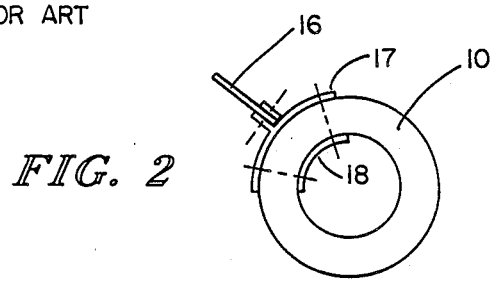
FIG. 2 is an end view of an auger showing the material ejecting paddles of the instant invention in accordance with the present invention.

While the retracting fingers 11 of the prior art can be left in place, ejecting paddles 16 of the invention are mounted on the auger 10 as shown in FIG. 2. Mounting plate 17 and back plate 18 are provided to mount the paddle 16 on the auger 10. More than one paddle 16 can be used and it has been found that with combines that two paddles 16 seem to provide the most efficient ejection of the material It should be understood that the paddles 16 can be used on any material moving auger and it is not restricted to grain augers used in combines Accordingly, other arrangements and numbers of paddles can be used for best results.

Figure 3:
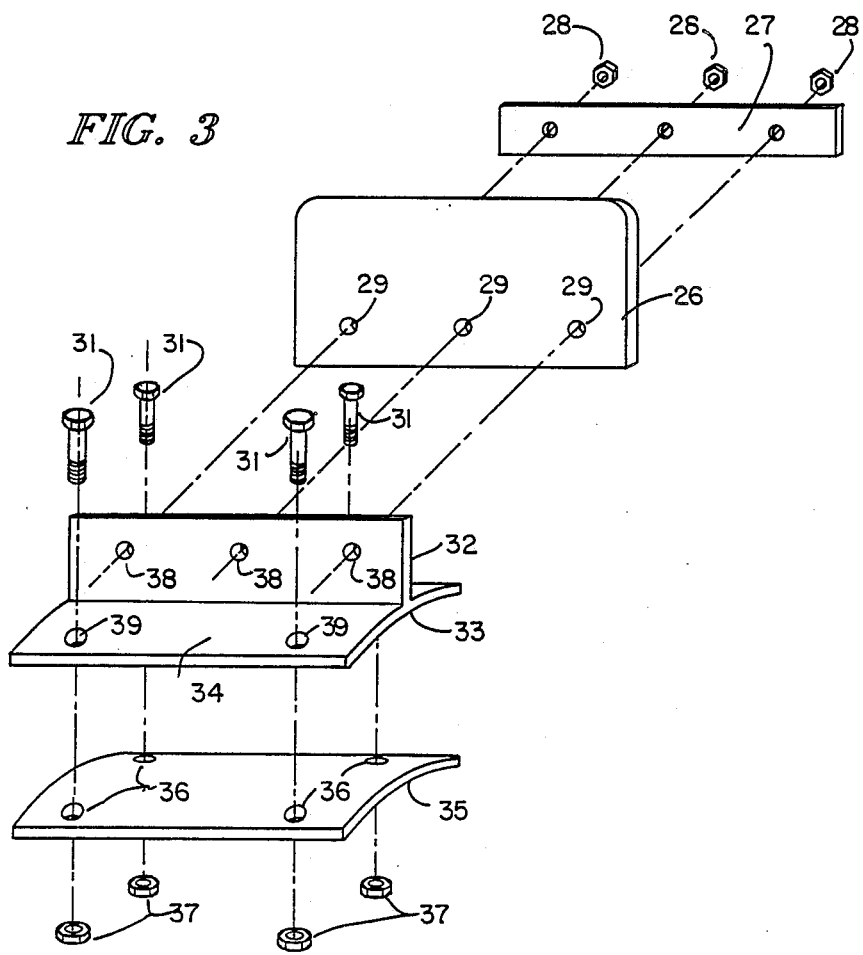
FIG. 3 is an exploded perspective view of one of the material ejecting paddles with the associated mounting components a in accordance with the present invention.

With reference now to FIG. 3, it can be seen that striking paddle 26 can be made of a rigid or semi-rigid material such as steel, aluminum, nylon and the like. Paddle 26 is a flat substantially rectangular plate having mounting holes 29 at the lower edge. Paddle 26 is mounted to the auger by the use of mounting plate 33 having a base 33 curved to match the curvature of the auger and mounting flange 32 extending substantially normal and away from the convex side of base 33. Holes 38 are provided in flange 32 to accept bolts (not shown) which would then extend through holes 29 in paddle 26 to be fitted with nuts 28 in a manner well known in the art. Thus assembled, paddle 26 and mounting 33 could then be mounted to the auger by employing backing plate 35 curved to fit the curvature of the auger and provide with holes 36. Bolts 31 extend through holes 39 in base plate 34 and holes (not shown) in the auger and holes 36 in backing plate 35 to be fitted with nuts 37 in a manner well known in the art.

Continuing now with reference to FIG. 4 where a second embodiment of the material ejecting paddle 30 of the instant invention is shown. Paddle 30 is made of a molded material such as plastic, nylon and the like. The material can bend so it need not be molded to fit the auger curvature until it is mounted. The paddle 30 is of an inverted "T" cross section as shown in FIG. 5. The base is formed with flanges 43 and 44 which are provided with mounting holes 49. Upstanding paddle plate 41 provides the striking plate for ejecting the material as previously desribed. Stiffening bars 42 and 45 are provided to further stiffen and reinforce paddle 30 is needed but paddle 30 could be mounted to the auger by use of holes 49 and appropriate nuts and bolts. When stiffening bars 42 and 45 are employed, they are placed on top of flanges 43 and 44 as shown in FIG. 4 so that holes 46 are aligned with holes 49 in molded paddle 30. Notch 48 is provided in the underside (auger side) of paddle 30 to allow for easier bending to fit the auger.

FIG. 6 depicts the paddle 30 in a side view in which it can be seen that plate 41 of paddle 30 presents a large area to the material to be ejected so that the material will be positively ejected at a right angle to the flow along the auger.

Although specific applications, materials, components, connections, sequences of events, and methods have been stated in the above description of the preferred embodiment of the invention, other suitable materials, other applications, components and process steps as listed herein may be used with satisfactory results and varying degrees of quality. In addition, it will be understood that various other changes in details, materials, steps, arrangements of parts and uses which have been herein described and illustrated in order to explain the nature of the invention will occur to and may be made by those skilled in the art, upon a reading of this disclosure, and such changes are intended to be included within the principles and scope of this invention as hereinafter claimed.

I claim:

1. A material ejecting paddle device for use with an auger of the type transporting material along and rotating about a longitudinal axis, the paddle device comprising:
    a replaceable padded having a substantially rectangular planar surface; said surface having a substantially perpendicular striking face when oriented parallel to the longitudinal axis of the auger;
    a threaded back-up plate; and
    a removable variably mounted base means for attaching said paddle to said auger to positively eject materials transported along said auger substantially transverse to the direction of flow of said transported materials.

2. The material ejecting paddle device as described in claim 1 wherein said striking face is provided with inner corners and out corners and wherein said outer corners are rounded.

3. The material ejecting paddle device as described in claim 1 further comprising a means of adjusting the area of said striking face by adding or removing paddles and associated back-up plates.

4. The material ejecting paddle device as described in claim 3 further comprising support means extending partway up both sides of the paddle and along the base means to support said paddle, wherein said support means is attached to said paddle and said base means.

* * * * *